United States Patent [19]

Loy

[11] Patent Number: 5,116,169
[45] Date of Patent: May 26, 1992

[54] APPARATUS AND METHOD FOR DRILLING GLASS

[75] Inventor: Garry M. Loy, Raleigh, N.C.

[73] Assignee: ABB Power T&D Company, Inc., Blue Bell, Pa.

[21] Appl. No.: 663,408

[22] Filed: Mar. 1, 1991

[51] Int. Cl.$^5$ ............................................. B23B 39/22
[52] U.S. Cl. ........................................ 408/39; 408/37; 408/40; 408/234
[58] Field of Search ............................ 408/37, 39–41, 408/43–45, 53, 234, 236; 51/80 R, 111 R, 283 R

[56] References Cited

U.S. PATENT DOCUMENTS

| | | | |
|---|---|---|---|
| 1,072,868 | 9/1913 | Monfils . | |
| 2,799,974 | 7/1957 | Andrysick et al. | 51/55 |
| 3,236,010 | 2/1966 | Evans et al. | 51/283 R |
| 3,568,367 | 3/1971 | Myers | 408/37 X |
| 3,704,554 | 12/1972 | Laughman | 51/55 |
| 3,822,509 | 7/1974 | Evertz et al. | 51/40 |
| 4,419,846 | 12/1983 | Schimitzek et al. | 51/55 |
| 4,573,835 | 3/1986 | Eckardt et al. | 408/37 |
| 4,730,420 | 3/1988 | Stratmann et al. | 51/283 R |
| 4,955,763 | 9/1990 | Delventhal et al. | 408/236 X |

Primary Examiner—Steven C. Bishop
Attorney, Agent, or Firm—Woodcock Washburn Kurtz Mackiewicz & Norris

[57] ABSTRACT

An apparatus and method are provided for drilling thin-walled glass articles. The apparatus is comprised of a drilling machine having upper and lower triangulated arm assemblies to which opposing drills are attached. The arm assemblies pivot about a common shaft. The shaft is supported by a support assembly attached to a sliding table. First and second actuators mounted on the support assembly urge the arm assemblies to pivot about the shaft, thereby controlling the feed rate and stroke of the drills. In a second embodiment adapted to drill deep glass articles, the lower arm assembly has an intermediate frame which pivots about an upper shaft along with the upper arm assembly. The lower arm assembly also has a lower arm which pivots about a lower shaft under the urging of a third actuator, allowing the drill spindle attached to the lower arm to enter and withdraw from the deep article without scratching the sides of the article.

34 Claims, 8 Drawing Sheets

APPARATUS AND METHOD FOR DRILLING GLASS

BACKGROUND OF THE INVENTION

The current invention relates to an apparatus and method for drilling glass. More specifically, the current invention relates to a machine adapted to drill a hole in a glass article by drilling into the upper and lower surfaces of the article in opposing directions.

In manufacturing thin-walled glass articles, such as the covers for electrical watt-hour meters, it is commonly necessary to drill several holes through the walls of the article in a high speed production line. In order to avoid cracking or chipping the glass, drilling through such thin-walled articles is typically done by using two opposing drills, each of which drills through one-half the thickness of the glass from a different side. Such drills are usually fed into the glass by moving them linearly along a slide. Unfortunately, since such slides are in close proximity to the drilling site, the cooling water which floods the drilling site often causes corrosion of the slide. In addition, the abrasive glass dust produced by the drilling contaminates the slide and causes wear in its mating components. As a result of this corrosion and wear, the slide becomes loose and requires frequent maintenance to maintain stability of the drill.

Accordingly, it would be desirable to provide a drilling machine in which the moving parts which allowed the drills to feed into the workpiece were remote from the drilling site.

SUMMARY OF THE INVENTION

It is an object of the current invention to provide a drilling machine and a method for drilling a work piece from opposing directions in a high speed production environment.

It is another object of the invention that the drilling machine stably support the drills affixed thereon so as to preclude chatter and vibration.

It is still another object of the invention that the joints which control the motion of the drills be remote from the drilling site so as to immunize them from corrosion and wear due to water and glass dust.

It is yet another object of the invention to provide a drilling machine which can be adapted to drill deep articles without danger of scratching the sides of the article when the drill is withdrawn.

These and other objects are accomplished in a drilling machine having upper and lower arm assemblies. Each arm assembly is formed from two members, each having first and second ends. The members of each arm are arranged so that their first ends are closer together than their second ends, creating a triangular arrangement in a horizontal plane and forming an acute angle between the members. An upper drill is attached to the first ends of the upper arm members and a lower drill is attached to the first ends of the lower arm members. The second ends of both the upper and lower arm members are pivoted about a shaft having first and second ends. One member from each of the upper and lower arms pivots about the first shaft end and one member from each of the upper and lower arms pivots about the second shaft end.

The shaft is supported by a support assembly having first and second supports clamped onto the first and second ends of shaft, respectively. The support assembly is attached to a table adapted for sliding in a horizontal plane. Actuators are mounted on the support assembly and connected to the upper and lower arms so as to urge the upper and lower arms to pivot about the shaft, thereby controlling the feed rate and stroke of the drills.

In a second embodiment of the invention, adapted to drill deep glass articles, the lower arm assembly has an intermediate frame which pivots about an upper shaft, along with the upper arm, and is clamped to a lower shaft. The lower arm assembly also has a lower arm which pivots about a lower shaft. An actuator urges the lower arm to pivot toward and away from the intermediate frame. The actuator can also hold the lower arm in fixed relation to the intermediate frame when the intermediate frame pivots about the upper shaft. Adjustable stops serve to maintain the lower arm in fixed relation with respect to the intermediate frame. Shock absorbers mounted on the stop ensure that the pivoting of the lower arm does not jar the upper arm while it drills the glass.

BRIEF DESCRIPTION OF THE DRAWINGS

FIGS. 4(a) and (b) are elevations of the drilling machine shown in FIG. 3 with the lower arm pivoting about the lower shaft in (a) and both the upper arm and the lower arm assemblies pivoting about the upper shaft in (b).

DESCRIPTION OF THE PREFERRED EMBODIMENT

Figure 1:
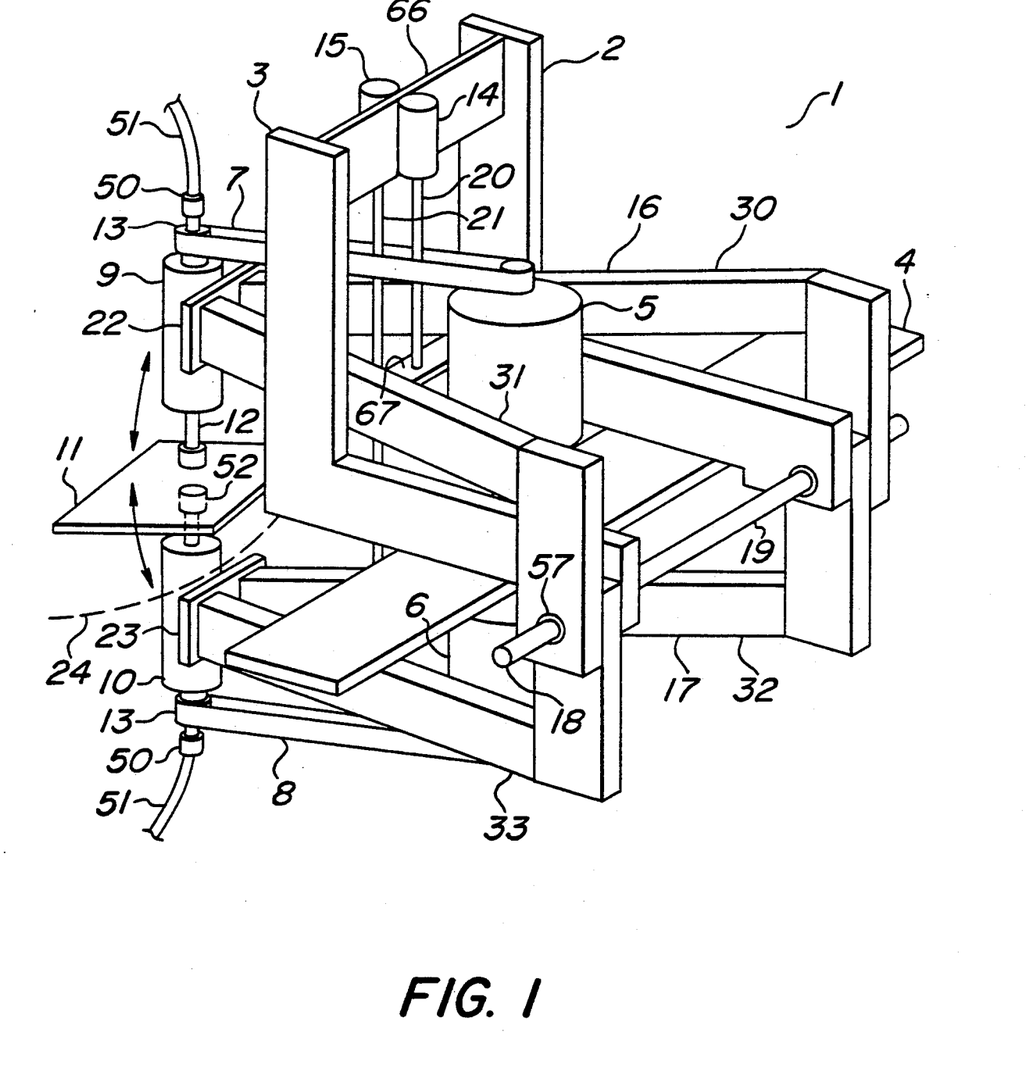
FIG. 1 is an isometric view of the drilling machine according to the current invention.

There is shown in FIG. 1 a glass drilling machine 1 according to the first embodiment of the current invention. The machine 1 is comprised of upper 16 and lower 17 triangulated arms which pivot about the centerline of a shaft 18. The upper arm is formed from two members 30, 31 which are arranged so as to form a triangle in a horizontal plane. A drill spindle 9 is mounted on a support plate 22 formed at the apex of the triangle. The shaft 18 is disposed through the ends of the members 30, 31 remote from the drill spindle 9, so that the triangle formed by the members pivots about its base. As shown in FIG. 1, a pivot joint 57 is disposed in member 31 to facilitate pivoting about shaft 18. A similar pivot joint (not shown) is disposed in member 30. The pivot joints 57 are discussed further below with respect to a second embodiment of the invention.

The drill spindle 9 is driven by a motor 5 via a belt 7 mounted on the sheave 13 of the drill spindle 9. The motor 5 is disposed between the members 30, 31 and mounted thereon. A core drill bit 12 is installed in the drill spindle 9. As shown in FIG. 1, the drill spindle 9 is supplied with cooling water via hose 51 connected to a rotating union 50 mounted on the sheave 13. The cooling water flows through drill spindle 9 and core drill bit 12 to cool both the bit and the glass 11 being drilled.

The lower arm 17 is arranged similar to the upper arm 16. Two members 32, 33 are arranged to form a triangle in a horizontal plane below and parallel to the horizontal plane of the upper arm 16. A lower drill spindle 10, containing a core drill bit 52, is mounted in opposing relation to the upper drill spindle 9 in a support plate 23 formed at the apex of the triangle. The drill spindle 10 is driven by a motor 6 via a belt 8 mounted on a sheave 13. Cooling water is supplied to the lower drill spindle 10 in a manner similar to that employed for the upper spindle 9. The pivoting of the lower arm 17 about shaft 18 is facilitated by portions (not shown in FIG. 1) of the pivots joints 57 which are disposed in members 32, 33.

The machine is supported by a support assembly comprised of supports 2 and 3 connected by a cross member 66. The shaft 18 extends through holes in the aft end of each support 2, 3 and is clamped thereto so that the shaft cannot rotate within the supports. This clamping arrangement is discussed further below with respect to a second embodiment of the invention. The supports 2, 3 are attached, for example by welding, to a slide table 4 which is mounted so as to slide fore and aft and side to side in a horizontal plane.

The pivoting of the upper 16 and lower 17 arms about the shaft 18 is driven by pneumatic actuators 14, 15. The pneumatic actuator 14 is connected to the upper arm 16 by a rod 20 attached, by a pivoting coupling, to a cross brace 67 connecting members 30 and 31. The pneumatic actuator 15 is connected to the lower arm 17 by a rod 21 attached to a cross brace (not shown) connecting members 32 and 33. The pneumatic actuators 14 and 15 are mounted on the support assembly cross member 66 and are adapted to rotate the upper 16 and lower 17 arms in both the clockwise and counterclockwise directions.

Figure 6:
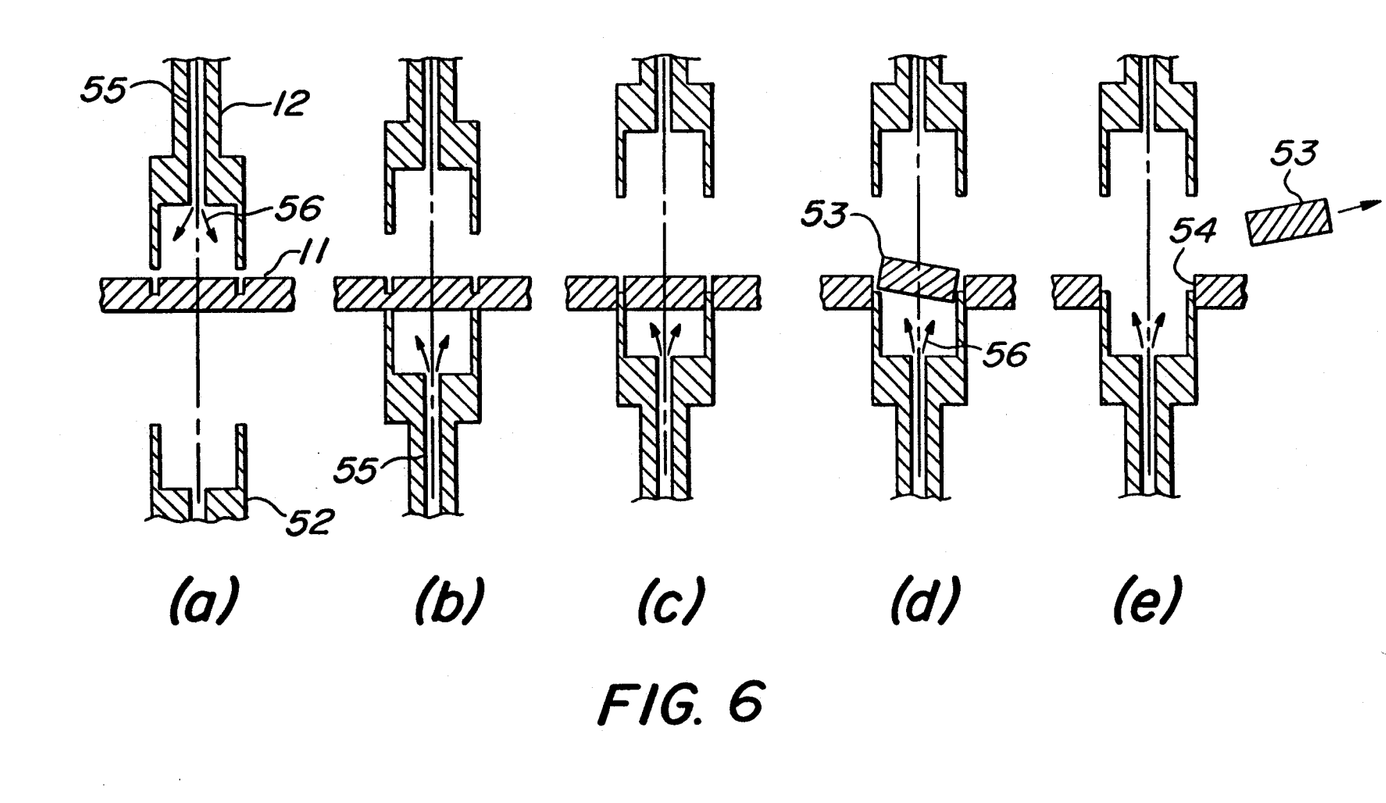
FIG. 6(a) through (e) shows the sequence of drilling operations according to the current invention.

As discussed further below, the drilling machine according to the current invention is most advantageously used in a drilling station in which a rotary indexing table conveys the article to be drilled between the drill bits 12 and 52. As soon as the article is in position, the first pneumatic actuator 14 causes the upper arm 16 to pivot downward about shaft 18 so that the drill bit 12 contacts the upper surface of the glass 11. The stroke and feed rate of the drill bit 12 are controlled by the actuator 14 so that the bit 12 drills through approximately one-half the thickness of the glass, as shown in FIG. 6(a). Note that during the drilling, water 56 flows through hole 55 in the bit 12 so as to flood the drilling area. The water 56 provides cooling and flushes away the abrasive glass dust produced by the drilling. The actuator 14 then retracts the bit 12 by causing the upper arm 16 to pivot upward about the shaft 18.

As soon as the upper drill bit 12 has been retracted, the second actuator 15 is sequenced to cause the lower arm 17 to pivot upward about shaft 18 so that lower drill bit 52 contacts the underside of the glass 11, as shown in FIG. 6(b). The actuator 15 controls the feed rate and stroke of the drill bit 52 so that it drills through the remaining one-half of the thickness of the glass 11, as shown in FIG. 6(c). As a result of the hollow cutting edge of the core drill bits 12 and 52, a circular plug of glass 53 is cut from the glass 11, thereby forming a hole 54. The pressure of the water 56 ejects the plug 53 from the hole 54, as shown in FIG. 6(e). The lower drill bit 52 is then fed through the glass 11 a short distance farther to remove any ridges left in the hole 54 by the upper drill bit 12. As the above description of the drilling method suggests, maintaining very accurate alignment between the upper and lower drill bits 12, 52 is crucial to proper drilling.

Since, as explained above, the drill bit feed is produced by pivoting the upper 16 and lower 17 arms about shaft 18, the heads of the drill bits 12, 52 actually travel in a short arc, rather than linearly. However, since the thickness of the glass article to be drilled is relatively thin and each bit drills only one-half of the glass thickness, if the length of the arms is sufficiently great, the deviation in the drill bit path from a straight line will be negligible. For example, if the glass is 0.64 cm (0.25 inch) thick and the distance from the drill bit centerline to the shaft 18 is 94 cm (37 inches), the deviation in the drill bit path through the glass from a straight line will be less than 0.003 cm (0.001 inch). Thus, in the preferred embodiment, the ratio of the distance between the drill bit centerline and the shaft to the stroke of the drill is at least 200:1 so that holes can be drilled within acceptable tolerances.

According to an important aspect of the current invention, there are no joints which are critical to the stability and accuracy of drilling operation in close proximity to the drilling site. Hence, the distance from the drill bits 12, 52 to the shaft 18 not only ensures that the bit path is nearly linear, it also removes the pivot joints 57 from the drilling area, thereby preventing the water and corrosive glass dust at the drilling site from causing wear and looseness in these pivot joints. It has been found that the pivot joints 57 are sufficiently removed from the drilling site to prevent corrosion and wear if the distance from the centerline of the spindles 9, 10 to the shaft 18 is at least approximately 61 cm (24 inches).

Since glass is extremely brittle, it is crucial that chatter and vibration in the drill bits 12, 52 be prevented. Accordingly, the drill spindles 9, 10 must be supported in a very stable manner. Unfortunately, such stability generally requires a bulky arrangement, whereas compactness is necessary in order to place the drill spindles of several machines in close proximity. The ability to place the drill spindles in close proximity is crucial to facilitate the creation of a high speed production set-up, such as that shown in FIG. 2. Placing the drill spindles in close proximity also reduces the diameter of the rotary indexing table 24 on which the glass articles are mounted, thereby contributing to the stability of the table.

According to the current invention, the conflicting requirements of compactness and stability are achieved by the triangulated arrangement of the upper and lower arms 16, 17. This arrangement provides a firm base for the pivot joints 57 since they are widely spaced apart. The triangular arrangement also provides a compact configuration at the drill spindles 9, 10 since they are located at the apex of the triangle. Thus, the current invention provides a bulky support where such bulk is advantageous and a compact support where such compactness in advantageous. In the preferred embodiment, adequate stability is obtained by spacing the pivot joints apart by at least approximately 41 cm (16 inches). This spacing can be obtained without the need for excessively long arms by arranging the upper arm members 30, 31 and the lower arm members 32, 33 so that they form an acute angle A, shown in FIG. 2, of at least 15°.

As shown in FIG. 1, the supports 2, 3 extend parallel to each other and are widely spaced apart adjacent the lower arm members 32, 33 by a sleeve 19 which encloses the portion of the shaft 18 between the supports. This arrangement is discussed further below with respect to a second embodiment of the invention. Note that, if it were desired to extend the supports 2, 3 farther forward—for example, to give the actuators 14, 15 more leverage—yet maintain a compact arrangement at the spindles 9, 10, the supports could be triangularly arranged in a fashion similar to that of the upper and lower arms 16, 17, with the actuators at the apex of the triangle.

Figure 3:
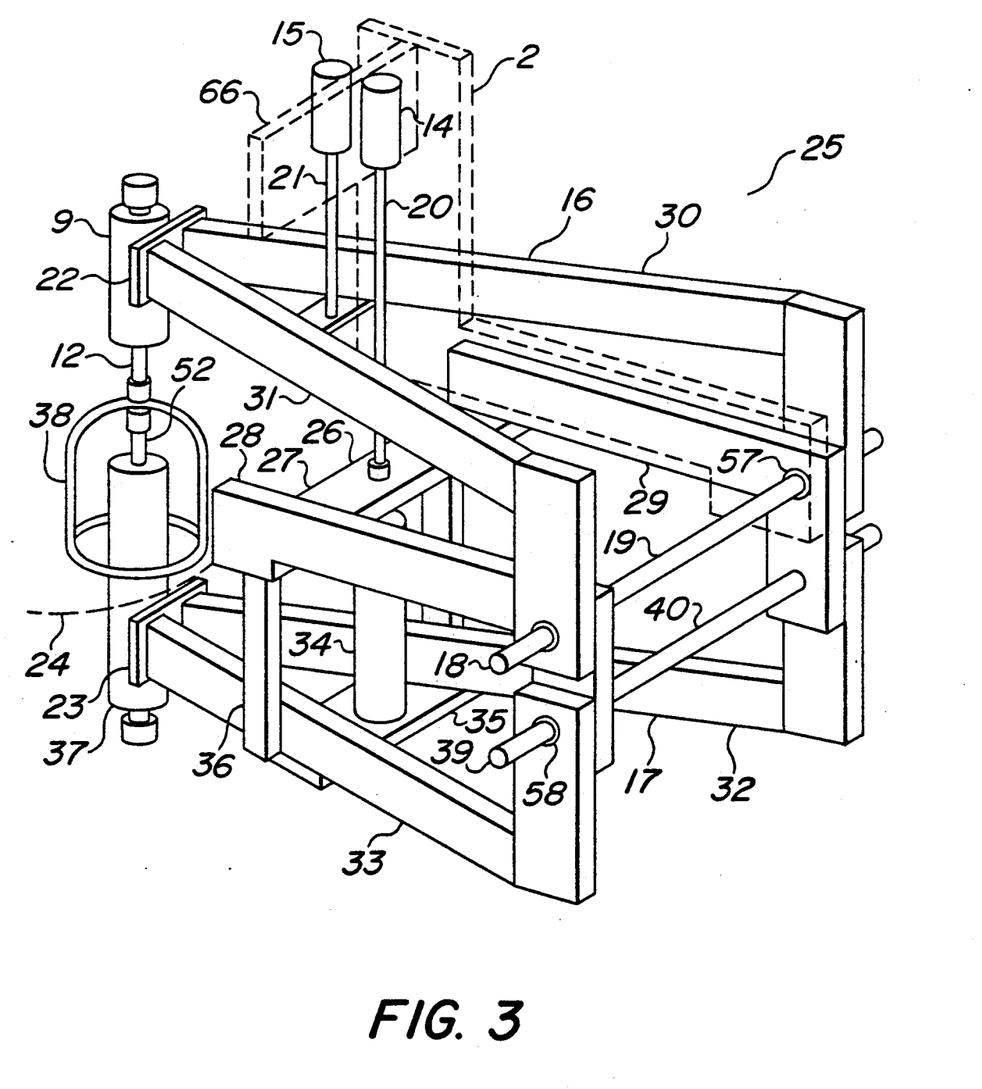
FIG. 3 is an isometric view of a second embodiment of the drilling machine shown in FIG. 1.
Figure 8:
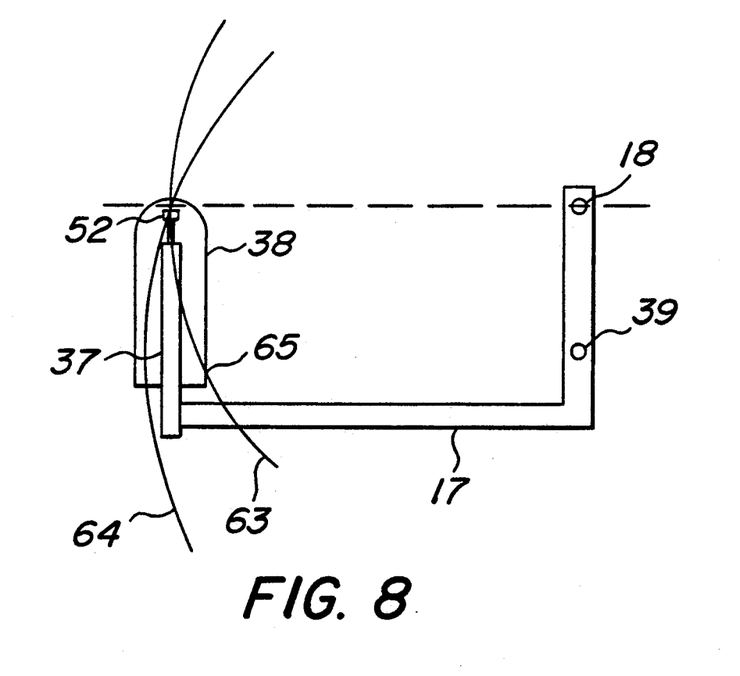
FIG. 8 is a schematic diagram showing a comparison between the pivoting action about the upper and lower shafts of the drilling machine shown in FIG. 3.

The embodiment shown in FIG. 1 is best suited for drilling holes in flat or relatively shallow glass articles. If a deep glass article 38, such as a high domed meter cover, is to be drilled, an elongated lower drill spindle 37 must be used, as shown in FIG. 3. Unless the lower arm 17 were extremely long, as a result of the depth of the article and the length of the spindle 37, the core drill 52 will strike the side of the glass article 38 when the spindle 10 is inserted or withdrawn from the article by the pivoting action of the lower arm 17. This principle is illustrated in FIG. 8 which shows that the core drill 52, which describes a circle 63 as it pivots about shaft 18, will contact the side of the article 38 at point 65. Such interference is especially likely if the machine is positioned so as to drill a hole close to the side of the glass article.

Accordingly, the above-mentioned problem is solved by the second embodiment of the invention, shown in FIG. 3. The drilling machine 25 shown in FIG. 3 is similar to the drilling machine 1 shown in FIG. 1 except for the addition of a novel lower arm pivoting arrangement which makes it especially suitable for drilling deep glass articles, such as the high domed meter cover 38. As shown in FIG. 3, the upper arm 16 is triangulated and pivots about the centerline of an upper shaft 18 on pivot joint 57 as before. The lower arm assembly is comprised of the lower arm 17 and an intermediate frame 26. The lower arm 17 is triangulated as before but now pivots at its aft end about the centerline of a lower shaft 39 on pivot joints 58. The intermediate frame 26 is comprised of longitudinally extending members 28, 29 and a transverse member 27 which connects the members 28, 29 at their forward ends. The longitudinally extending members 28, 29 pivot at their aft ends about the centerline of shaft 18 on pivot joints 57 but are rigidly clamped to lower shaft 39.

As shown in FIG. 3, a pneumatic actuator 34 is disposed between the transverse member 27 and a cross brace 35 connected to the longitudinal members 32, 33. The shafts 18 and 39 are parallel and spaced apart in a vertical plane. Note that the farther apart shafts 18 and 39 are spaced, the deeper the glass article which may be drilled without having the core drill bit 52 contact the sides of the article when the lower arm 17 pivots. Note that for simplicity, only one of the supports 2 and the cross member 66 is shown, in phantom, in FIG. 3. However, it should be understood that the machine 25 is supported in a manner similar to machine 1 shown in FIG. 1.

Figure 4:
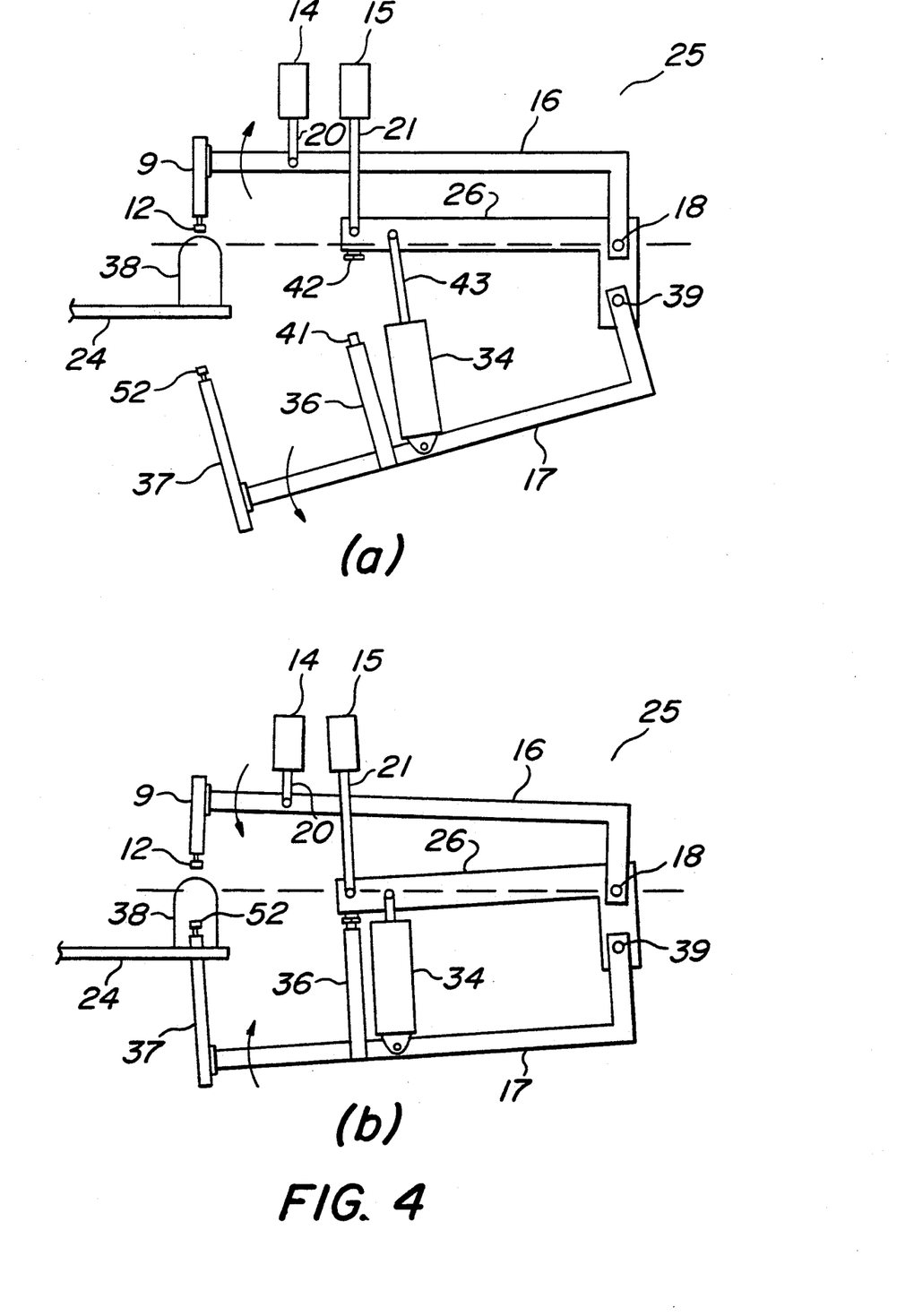

Each time the machine 25 completes its drilling on a glass article 38, the actuator 34 and rod 43 cause the lower arm 17 to pivot downward about shaft 39, as shown in FIG. 4(a). Since the axis of shaft 39 is disposed below the axis of shaft 18—and therefore below the horizontal plane in which the tip of the drill bit 52 lies—the bit 52 does not contact the sides of the article 38 when the lower arm 17 pivots. This principle is illustrated in FIG. 8 which shows that the core drill 52, which describes a circle 64 as it pivots about shaft 39, does not contact the side of the article 38 as it does when it pivots about shaft 18. Note that actuator 15, connected to the intermediate frame 26 by rod 21, holds the intermediate frame in a fixed position during the pivoting of the lower arm 17 so that the lower arm pivots away from the intermediate frame.

With the lower arm 17 in the dropped position, as shown in FIG. 4(a), the rotary indexing table 24 rotates so as to move a fresh article between the drill bits 12, 52. Immediately thereafter, actuator 14 causes the upper arm 16 to pivot downward about shaft 18 so as to begin drilling through the upper one-half of the thickness of the article, as shown in FIG. 6(a). While upper drill bit 12 is drilling into the article, actuator 34 causes the lower arm 17 to pivot upward about shaft 39 so that lower spindle 37 enters the article 38.

As shown in FIG. 4(b), the upward pivoting of the lower arm 17 is arrested by stops 36 so that the travel of the lower drill bit 52 stops a predetermined distance short of the surface of the article to be drilled. The stops 36 are attached to members 32, 33, as shown in FIG. 3. Each stop 36 contacts the head of an adjusting screw 42 threaded into the intermediate frame 26. Utilizing stops 36 and adjusting screws 42 ensures that the lower arm 17 can always be correctly positioned relative to the article 38 regardless of variations in the travel of actuator 34 due to wear, etc.

In order to maintain a rapid production rate, the lower arm 17 is pivoted rapidly into position by actuator 34 while the upper bit 12 is drilling. Consequently, impact of the stops 36 on the adjusting screws 42 could cause vibration within the machine which would jar the upper bit and crack the glass. Such impact is prevented by shock absorbers 41 mounted on the end of each stop 36. The shock absorbers 41 may be of the mechanical, pneumatic or hydraulic type and are preferably adjustable so as to provide linear deceleration as the lower arm 17 comes to rest.

Once the upper bit 12 has completed its drilling cycle and is withdrawn by pivoting upward about shaft 18 at the urging of actuator 14, actuator 15 causes the intermediate frame 26 to pivot upward around shaft 18. During this action, actuator 34 maintains the lower arm 17 and intermediate frame 26 in a fixed spacial relation so that the lower arm and intermediate frame pivot upward about shaft 18 as a single unit. Thus, by pivoting about shaft 18 at the urging of actuator 15, the lower drill bit 52 moves from its position a short distance below the article, as set by the adjusting screws 42, and drills through the underside of the article to complete the drilling, as shown in FIGS. 6(b)-(e).

The pivoting of the lower arm assembly—that is, the pivoting of the intermediate frame 26 and lower arm 17 combination held in fixed relation—about shaft 18 is illustrated in FIG. 4(b), along with the pivoting of the upper arm 16. Note that FIG. 4(b) shows the upper and lower arms pivoting apart about shaft 18 in an exaggerated fashion to illustrate the principal of their pivoting action. However, it should be realized that in actuality the upper and lower arms pivot toward and away from each other about shaft 18 only far enough to cause the upper and lower drill bits to move slightly more than one half of the thickness of the glass article 38.

Figure 5:
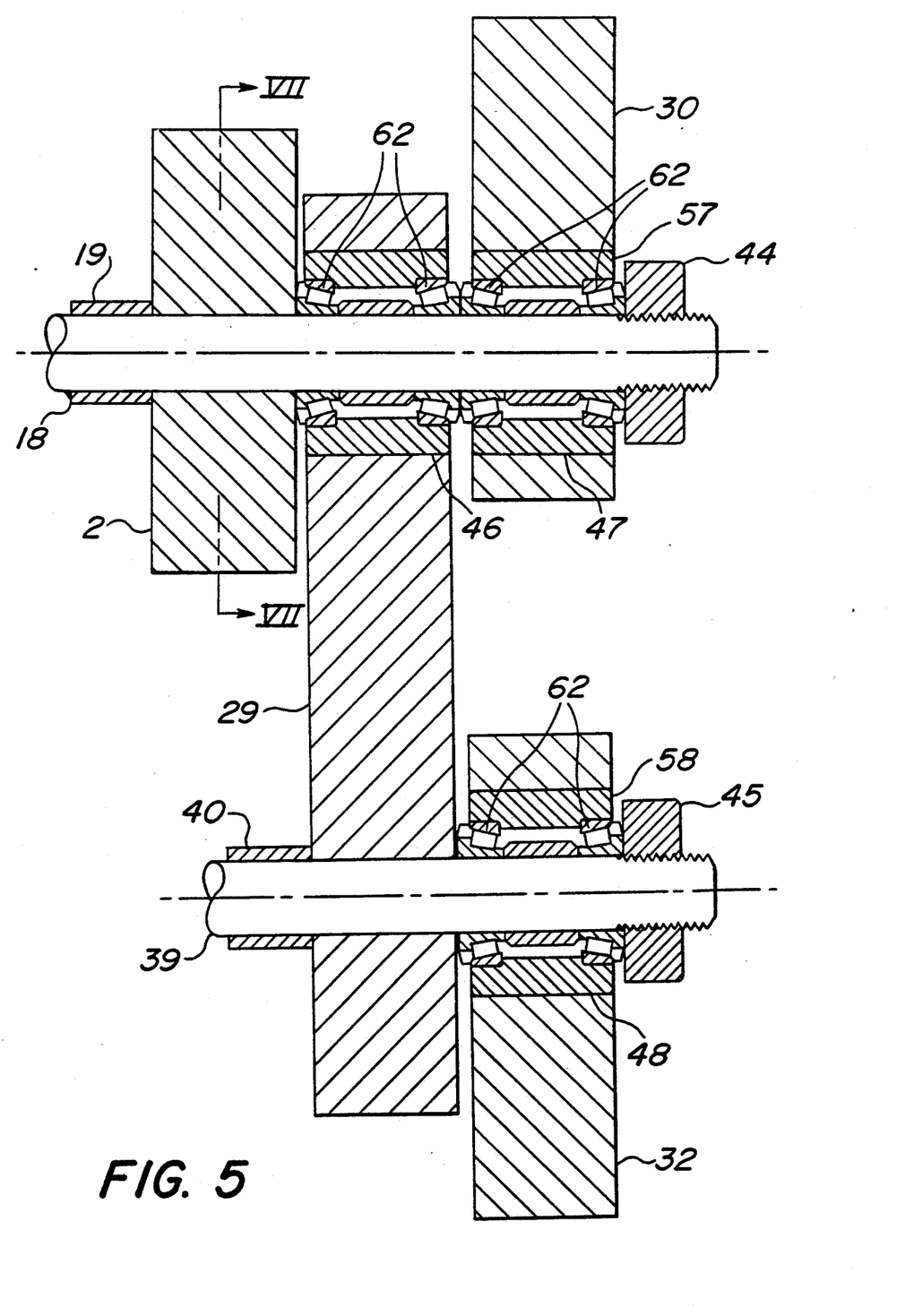
FIG. 5 is a cross-section through the upper and lower pivot joints on one side of the drilling machine shown in FIG. 3.

Since as previously discussed, maintaining the stability of the upper and lower arms 16, 17 is of utmost importance, special attention has been given to the upper and lower pivot joints 57 and 58. The upper and lower pivot joints on one side of the drilling machine 25 shown in FIG. 3 are shown in FIG. 5. As shown therein, each upper pivot joint 57 is comprised of two pairs 46, 47 of opposing tapered roller bearings 62. Bearing pair 46 is installed in member 29 of the intermediate frame 26 and bearing pair 47 is installed in member 30 of the upper arm 16. Since each bearing pair 46, 47 has opposed roller bearings 62 to absorb any thrust load along the axis of the shaft 18, motion of the upper arm and intermediate frame along the shaft 18 is prevented without impairing the pivoting action.

Figure 7:
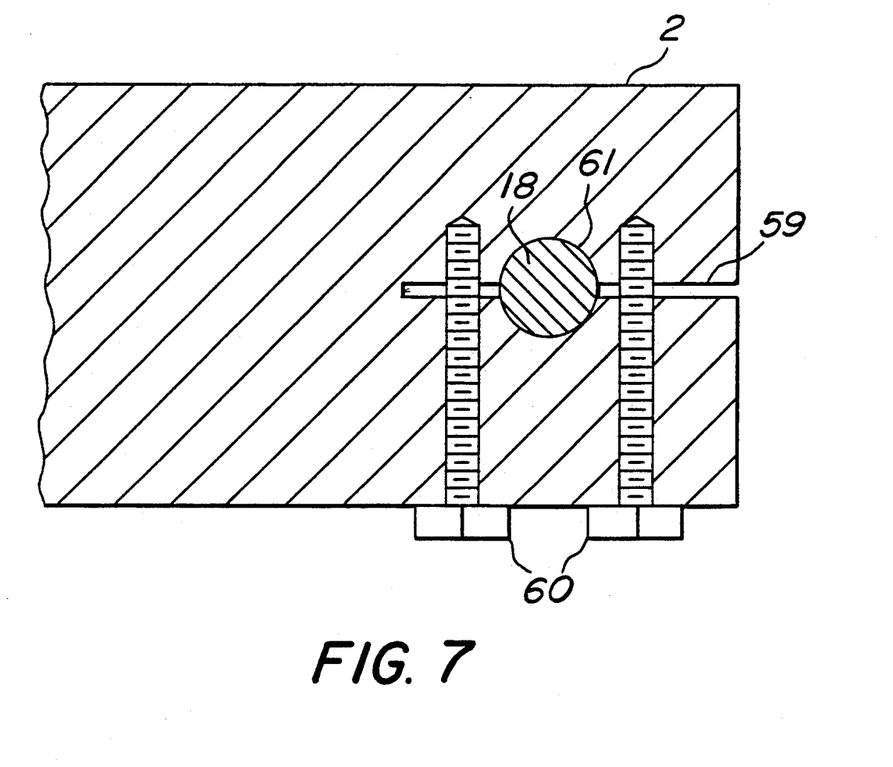
FIG. 7 is a cross-section through line VII—VII shown in FIG. 5.

A similar arrangement is utilized on the other side of the machine with respect to members 28 and 31. As shown in FIG. 7, the support 2 is clamped onto the shaft 18 by disposing the shaft through a close fitting hole 61 in the support. A slot 59 is cut transversely through the hole 61 and screws 60 are threaded into the support and extend through the slot. Tightening the screws 60 compresses the sides of the slot 59 together, thereby clamping the support 2 around the shaft 18. This arrangement ensures that the support 2 is fixedly clamped to the shaft 18 and cannot rotate with respect to the shaft. A similar arrangement is used to clamp support 3 to the other end of shaft 18.

Nuts 44 (one of which is shown in FIG. 5) are threaded onto each end of the upper shaft 18 and secure the ends of the upper arm members 30, 31 and the lower arm members 32, 33 onto the shaft. Tightening the nuts 44 allows a controlled amount of pre-load to be placed on the roller bearings and compresses the upper arm members 30, 31 and the intermediate frame members 28, 29 against the supports 2, 3. The sleeve 19 which encloses the portion of shaft 18 between the supports 2, 3 ensures that the upper pivot joints 57 on each side of the machine are maintained in the correct spaced relation.

A similar arrangement is utilized in the lower pivot joints 58, as shown in FIG. 5. A pair 48 of opposed tapered roller bearings 62 are installed in each of the lower arm members 32, 33. Nuts 45 are threaded onto the ends of the lower shaft 39. The nuts 45 pre-load the bearing pairs 48 and compresses the lower arm members 32, 33 against the intermediate frame members 28, 29. A sleeve 40, which encloses the portion of the lower shaft 39 between the intermediate frame members 28, 29, ensures that the lower pivot joints 58 on each side of the machine are maintained in the correct spaced relation.

The intermediate frame members 28, 29 are fixedly clamped onto shaft 39 using the same arrangement, shown in FIG. 7, by which the supports 2, 3 are clamped onto shaft 18.

Although FIG. 5 depicts the pivot joints 57 as applied to the drilling machine 25 shown in FIG. 25, it should be realized that a similar approach can be utilized with respect to the drilling machine shown in FIG. 1—that is, pairs 47 of tapered roller bearings are installed in members 30, 31 of the upper arm 16 and pairs 46 of tapered roller bearings are installed in members 32, 33 of the lower arm 17. Nuts 44 compress members 30, 32 against support 2 and compress members 31, 33 against support 3.

Figure 2:
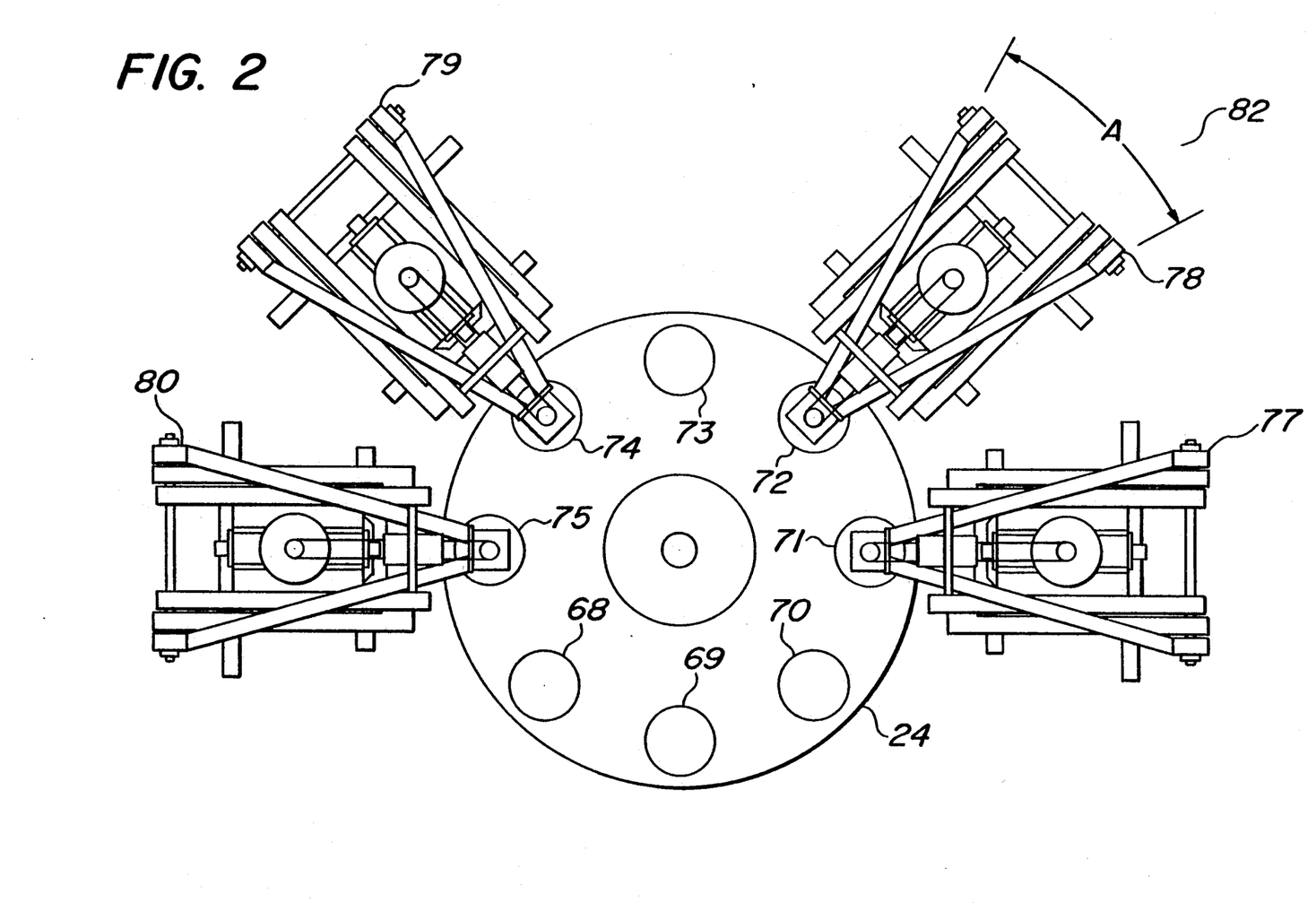
FIG. 2 is a plan view of a drilling station utilizing the drilling machine shown in FIG. 3.
Figure 9:
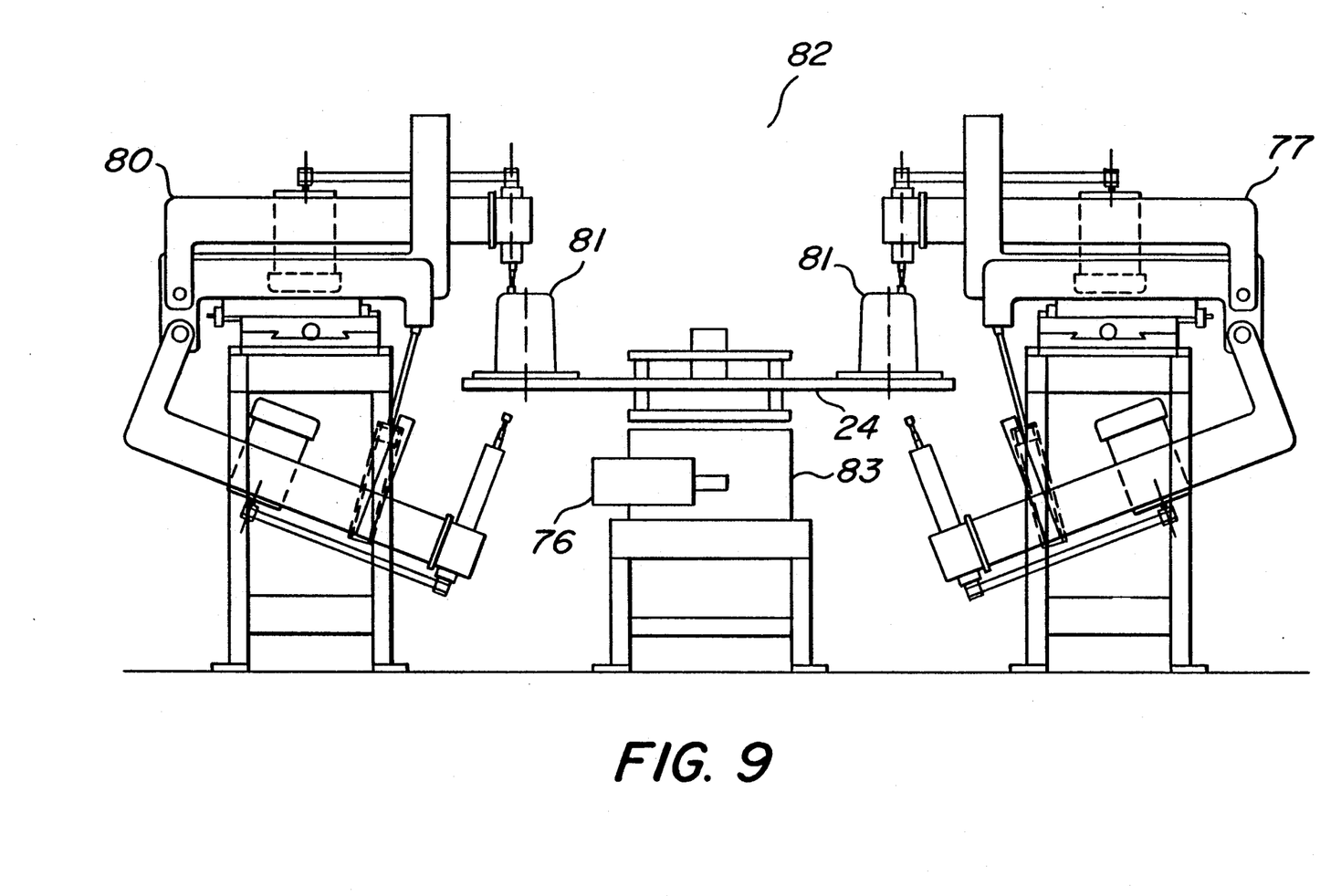
FIG. 9 is an elevation of the drilling station shown in FIG. 2.

The drilling machine of the current invention is most advantageously used in a relatively high speed glass article production line by incorporating it into a drilling station 82 such as that shown in FIGS. 2 and 9. In the preferred embodiment, the drilling station 82 is comprised of four drilling machines 77-80 according to the current invention arranged around a rotary indexing table 24 which carries the glass meter covers 81 to be drilled from one machine to the next.

As shown in FIG. 2, the rotary indexing table 24 has eight positions—positions 71, 72, 74 and 75 are for drilling, positions 68 and 69 are for loading/unloading of the meter covers, position 70 is used to sense whether a meter cover has been loaded for control purposes, and position 73 provides access to drilling machines 78 and 79. The table 24 is mounted on an indexer 83 which is driven by a motor 76, as shown in FIG. 9.

Typically, the manufacture of meter covers requires the drilling of either two or four holes in each cover, depending on the style of meter cover being produced. If four holes are required, one meter cover at a time is loaded onto the table 24 and the indexer 83 rotates the table 45°—that is, from one position to the next—on each indexing cycle and then stops so that drilling can be performed. Under this method, each drilling machine 77-80 drills one of the required holes in each cover 81. However, if only two holes are required in each meter cover 81, two meter covers are loaded onto the table at a time and the indexer 83 controller (not shown) directs the indexer to stop on only every other indexing cycle, so that the table is effectively rotated 90° and then stopped. Under this method, drilling machines 77 and 80 drill the first and second holes, respectively, in one half of the meter covers and drilling machines 78 and 79 drill the first and second holes, respectively, in the other half of the meter covers.

Although the invention has been discussed with reference to a machine for drilling, it should be appreciated that the invention could also be applied to other machines in which it is desired to apply opposing members to opposite sides of a work piece. Moreover, the present invention may be embodied in other specific forms without departing from the spirit or central attributes thereof and, accordingly, reference should be made to the appended claims, rather than to the foregoing specification, as indicating the scope of the invention.

What is claimed:

1. A drilling machine comprising:
   a) upper and lower arm assemblies;
   b) upper and lower drills mounted on said upper and lower arm assemblies, respectively;
   c) first means for pivoting said upper and lower arm assemblies about a first centerline; and
   d) second means for pivoting said lower arm assembly about a second centerline.

2. The drilling machine according to claim 1, wherein said first and second centerlines are parallel.

3. The drilling machine according to claim 2, wherein said first and second centerlines are spaced apart in a vertical plane.

4. The drilling machine according to claim 1 wherein said lower arm assembly comprises a lower arm adapted to pivot about said second pivot means and a frame adapted to pivot about said first pivot means, said lower drill mounted on said lower arm.

5. The drilling machine according to claim 4 further comprising means for maintaining said lower arm and said frame in a fixed relation when said frame pivots about said first pivot means.

6. The drilling machine according to claim 5, wherein said fixed relation maintaining means comprises means for urging said lower arm to pivot about said second pivot means.

7. The drilling machine according to claim 6, wherein said fixed relation maintaining means comprises a first pneumatic actuator.

8. The drilling machine according to claim 5, further comprising means for independently urging said upper arm and said frame to pivot about said first pivot means in both the clockwise and counterclockwise directions.

9. The drilling machine according to claim 8, wherein said independent pivot urging means comprises second and third pneumatic actuators.

10. The drilling machine according to claim 5, wherein said fixed relation maintaining means comprises a stop disposed between said frame and said lower arm.

11. The drilling machine according to claim 10, further comprising means for adjusting said fixed relation.

12. The drilling machine according to claim 4, further comprising means for urging said lower arm to pivot about said second pivot means both away from and toward said frame.

13. The drilling machine according to claim 12, further comprising means for stopping said pivoting of said lower arm about said second pivot means toward said frame and means for absorbing shock associated with said stopping.

14. The drilling machine according to claim 13, wherein said shock absorbing means is a fluid shock absorber mounted on said stopping means.

15. The drilling machine according to claim 4, wherein said first pivot means comprises a first shaft extending through said upper arm assembly and said frame and said second pivot means comprises a second shaft extending through said lower arm.

16. A drilling machine comprising:
 a) upper and lower approximately triangularly shaped arm assemblies, said triangular shape forming an apex and a base for each arm assembly;
 b) first and second drills attached to the apex of said upper and lower arm assemblies, respectively; and
 c) means for pivoting said first and second arm assemblies about a common centerline, said pivoting means disposed in the base of said upper and lower arm assemblies.

17. The drilling machine according to claim 16, wherein said apex of each of said triangular shapes forms an angle of at least approximately 15°.

18. The drilling machine according to claim 16 further comprising means for stroking said first and second drills a predetermined length, the ratio of the distance between said first drill and said common centerline to said stroke length being at least approximately 200:1.

19. The drilling machine according to claim 16 wherein:
 a) said upper arm assembly has first and second members, each of said members having first and second ends, said members arranged so that said first ends are closer together than said second ends, whereby said first and second members form said first arm assembly triangular shape in a horizontal plane;
 b) said lower arm assembly has third and fourth members, each of said third and fourth members having first and second ends, said members arranged so that said first ends are closer together than said second ends, whereby said third and fourth members form said second arm assembly triangular shape in a horizontal plane;
 c) said first drill is attached to said first ends of said first and second members, said second drill is attached to said first ends of said third and fourth members; and
 d) said pivot means comprises a pivot shaft extending through said first, second third and fourth members, said members adapted to pivot about said pivot shaft.

20. The drilling machine according to claim 19, wherein said first and second members and said third and fourth members are each spaced apart at least approximately 16 inches in the location where said shaft extends through said members.

21. The drilling machine according to claim 19, wherein said pivot shaft has first and second spaced apart portions, said first and third members adapted to pivot about said first portion of said pivot shaft and said second and fourth members adapted to pivot about said second portion of said pivot shaft.

22. The drilling machine according to claim 21, further comprising a support assembly for supporting said drilling machine.

23. The drilling machine according to claim 22, further comprising a table adapted to slide in a horizontal plane and wherein said support assembly is mounted on said table.

24. The drilling machine according to claim 22, wherein said support assembly comprises first and second supports, each of said supports having first and second portions, said first portion of said first support fixedly attached to said first portion of said pivot shaft and said first portion of said second support fixedly attached to said second portion of said pivot shaft.

25. The drilling machine according to claim 22, further comprising means for urging said upper and lower arm assemblies to pivot about said pivot shaft.

26. The drilling machine according to claim 25, wherein said pivot urging means are mounted on said support assembly.

27. The drilling machine according to claim 26, wherein said pivot urging means comprises first and second pneumatic actuators.

28. The drilling machine according to claim 21, further comprising means disposed on said pivot shaft for securing said first, second, third and fourth members onto said pivot shaft.

29. The drilling machine according to claim 28 wherein said securing means comprises first and second nuts threaded onto said first and second portions of said pivot shaft, respectively.

30. The drilling machine according to claim 28, further comprising means for restraining motion along the axis of said pivot shaft formed on each of said first, second, third and fourth members.

31. The drilling machine according to claim 30, wherein said motion restraining means comprises a pair of opposing tapered roller bearings mounted in each of said first, second, third and fourth members.

32. A machine for applying a tool to opposing sides of a deep glass articles comprising:
 a) an upper arm forming a first triangle adapted to rotate about a first pivot means at the base of said first triangle, a first tool mounted at the apex of said first triangle;
 b) a lower arm forming a second triangle adapted to rotate about a second pivot means at the base of said second triangle, a second tool mounted at the apex of said second triangle, said second tool mounted in opposed relation to said first tool, said first and second pivot means being in parallel spaced relation;

c) a frame adapted to rotate about said first pivot means;

d) means for maintaining said lower arm in fixed relation to said frame and for urging said lower arm to rotate about said second pivot means away from said frame; and e) means for urging said upper arm and said frame to rotate about said first pivot means.

33. The machine according to claim 32 wherein said first pivot means comprises a shaft, and further comprising a slidable support attached to said shaft.

34. A method of operating on a deep workpiece with first and second opposing members, comprising the steps of:

a) moving said second member away from said first member along an arcuate path about a first pivot point;

b) placing said workpiece between said first and second members;

c) moving said first member toward and onto said workpiece along an arcuate path about a second pivot point spaced a first predetermined distance from said first pivot point and simultaneously moving said second member toward said workpiece along an arcuate path about said first pivot point;

d) stopping said arcuate motion of said second member about said first pivot point a second predetermined distance from said workpiece; and e) moving said second member toward and onto said workpiece along an arcuate path about said second pivot point.

* * * * *